United States Patent
Kim et al.

(10) Patent No.: US 10,135,289 B2
(45) Date of Patent: Nov. 20, 2018

(54) WIRELESS POWER RECEIVER AND METHOD FOR CONTROLLING THE WIRELESS POWER RECEIVER

(71) Applicant: Samsung Electronics Co., Ltd., Suwon-si, Gyeonggi-do (KR)

(72) Inventors: Bong-Chul Kim, Seoul (KR); Dong-Zo Kim, Yongin-si (KR); Sung-Ku Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/362,050

(22) Filed: Nov. 28, 2016

(65) Prior Publication Data

US 2017/0155272 A1 Jun. 1, 2017

(30) Foreign Application Priority Data

Dec. 1, 2015 (KR) ........................ 10-2015-0170141

(51) Int. Cl.
*H02J 7/02* (2016.01)

(52) U.S. Cl.
CPC .................................. *H02J 7/025* (2013.01)

(58) Field of Classification Search
CPC .................................. H02J 7/025; H02J 17/00
USPC ....................................................... 320/108
See application file for complete search history.

(56) References Cited

U.S. PATENT DOCUMENTS

| 8,970,060 B2* | 3/2015 | Ichikawa et al. | B60L 11/123 307/10.1 |
| 2011/0198937 A1 | 8/2011 | Tseng | |
| 2013/0015813 A1 | 1/2013 | Kim et al. | |
| 2014/0084688 A1 | 3/2014 | Tzanidis et al. | |
| 2015/0022017 A1 | 1/2015 | Kim et al. | |
| 2015/0171820 A1* | 6/2015 | Koike et al. | H02J 5/005 320/109 |
| 2015/0229132 A1 | 8/2015 | Katsunaga et al. | |

(Continued)

FOREIGN PATENT DOCUMENTS

| WO | 2014045875 A1 | 3/2014 |
| WO | 2015029221 A1 | 3/2015 |

OTHER PUBLICATIONS

European Search Report dated Aug. 23, 2018, issued in European Application No. 16871008.5-1202 / 3347966.

*Primary Examiner* — Sun Lin
(74) *Attorney, Agent, or Firm* — Jefferson IP Law, LLP

(57) ABSTRACT

A wireless power receiver and a method for controlling the wireless power receiver are provided. The wireless power receiver includes a resonant circuit configured to receiving electromagnetic waves from a wireless power transmitter and output alternate current (AC) power, a rectifier configured to rectify the AC power received from the resonant circuit into direct current (DC) power, a DC/DC converter configured to convert the DC power received from the rectifier and output the converted DC power, a battery, a charger configured to charge the battery with the converted DC power, and a controller configured to, upon detection of an event indicating a change in impedance at an output end of the DC/DC converter, control the impedance at the output end of the DC/DC converter and keep the impedance constant by adjusting voltage at the output end of the DC/DC converter.

25 Claims, 16 Drawing Sheets

(56) References Cited

U.S. PATENT DOCUMENTS

2015/0295450 A1 10/2015 Bae
2016/0226312 A1 8/2016 Suzuki

* cited by examiner

WIRELESS POWER RECEIVER AND METHOD FOR CONTROLLING THE WIRELESS POWER RECEIVER

CROSS-REFERENCE TO RELATED APPLICATION(S)

This application claims the benefit under 35 U.S.C. § 119(a) of a Korean patent application filed on Dec. 1, 2015 in the Korean Intellectual Property Office and assigned Serial number 10-2015-0170141, the entire disclosure of which is hereby incorporated by reference.

TECHNICAL FIELD

The present disclosure relates to a wireless power receiver and a method for controlling the wireless power receiver. More particularly, the present disclosure relates to a wireless power receiver for wirelessly receiving power from a wireless power transmitter, and a method for controlling the wireless power receiver.

BACKGROUND

In view of their nature, mobile terminals such as portable phones and personal digital assistants (PDAs) are powered by rechargeable batteries. To charge the batteries, the mobile terminals apply electric energy to the batteries through separate chargers. Typically, the charger and the battery each have an exterior contact terminal and thus are electrically connected to each other by contacting their contact terminals.

This contact-based charging scheme faces the problem of vulnerability of contact terminals to contamination of foreign materials and the resulting unreliable battery charging because the contact terminals protrude outward. Moreover, if the contact terminals are exposed to moisture, the batteries are not charged properly.

To address the above problem, wireless charging or contactless charging technologies have recently been developed and applied to many electronic devices.

Such a wireless charging technology is based on wireless power transmission and reception. For example, once a portable phone is placed on a charging pad without being connected to an additional charging connector, its battery is automatically charged. Among wirelessly charged products, wireless electric toothbrushes or wireless electric shavers are well known. The wireless charging technology offers the benefits of increased waterproofness due to wireless charging of electronic products and enhanced portability due to no need for a wired charger for electronic devices. Further, it is expected that various relevant wireless charging technologies will be more developed in the upcoming era of electric vehicles.

There are largely three wireless charging schemes, namely electromagnetic induction using coils, resonance-based, and radio frequency (RF)/microwave radiation based on conversion of electric energy to microwaves.

So far, the electromagnetic induction-based wireless charging scheme has been dominantly popular. However, considering recent successful experiments in wireless power transmission over microwaves at a distance of tens of meters in Korea and other overseas countries, it is foreseeable that every electronic product will be charged cordlessly at any time in any place in the near future.

Electromagnetic induction-based power transmission means power transfer between primary and secondary coils. When a magnet moves through a coil, current is induced. Based on this principle, a transmitter creates a magnetic field and a receiver produces energy by current induced by a change in the magnetic field. This phenomenon is called magnetic induction, and power transmission based on magnetic induction is highly efficient in energy transfer.

In 2005, regarding resonance-based wireless charging, professor Soljacic in the Massachusetts Institute of Technology (MIT) suggested a system that makes wireless energy transfer from a charger at a distance of a few meters based on the resonance-based power transmission principle by the coupled mode theory. The wireless charging system of the MIT team is based on a physics concept called resonance in which a sounding tuning fork causes a nearby wine glass to chime at the same frequency. The MIT team resonated electromagnetic waves carrying electric energy, instead of sound. The resonant electric energy is directly transferred only in the presence of a device having the same resonant frequency, while the unused electric energy is reabsorbed into the electromagnetic field rather than it is dispersed in the air. Thus the resonant electric energy does not affect nearby machines or human bodies, compared to other electronic waves.

The charging efficiency of a wireless power receiver depends on impedance change. For example, each of a wireless power transmitter and a wireless power receiver may perform impedance matching. If impedance is matched, charging efficiency may be increased relatively. Meanwhile, the wireless power receiver may include a matching circuit which has electric devices such as a capacitor or an inductor, for impedance matching. The wireless power receiver may perform impedance matching by operating the matching circuit, thus increasing charging efficiency. However, since the matching circuit includes electric devices, for impedance matching, it increases the weight and volume of an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless power receiver for maintaining impedance at a predetermined value adaptively without using a matching circuit for impedance matching, and a method for controlling the wireless power receiver.

In accordance with an aspect of the present disclosure, a wireless power receiver is provided. The wireless power receiver includes a resonant circuit configured to receive electromagnetic waves from a wireless power transmitter and output alternate current (AC) power, a rectifier configured to rectify the AC power received from the resonant circuit into direct current (DC) power, a DC/DC converter configured to convert the rectified DC power received from the rectifier and output the converted DC power, a battery, a charger configured to charge the battery with the converted DC power, and a controller configured to, upon detection of an event indicating a change in impedance at an output end of the DC/DC converter, control the impedance at the output end of the DC/DC converter to be kept constant by adjusting voltage at the output end of the DC/DC converter.

In accordance with another aspect of the present disclosure, a method for controlling a wireless power receiver is provided. The method includes receiving electromagnetic waves from a wireless power transmitter and outputting AC power, rectifying the AC power into DC power, converting the rectified DC power, charging a battery of the wireless power receiver with the converted DC power, and upon detection of an event indicating a change in impedance at an output end of a DC/DC converter, controlling the impedance at the output end of the DC/DC converter to be kept constant by adjusting voltage at the output end of the DC/DC converter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
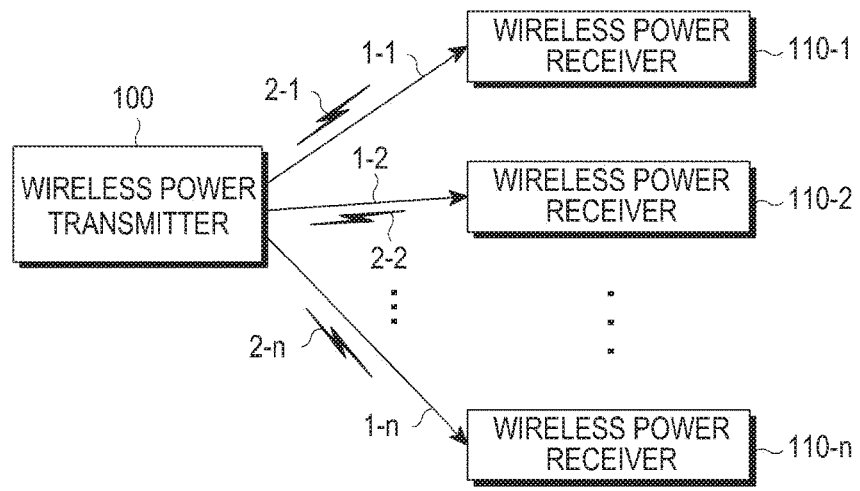
FIG. 1 is a conceptual view illustrating an overall operation of a wireless charging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature (for example, number, function, operation, or component like a part), not excluding the presence of addition of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used in the present disclosure may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

The terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

FIG. 1 is a conceptual view illustrating an overall operation of a wireless charging system according to an embodiment of the present disclosure.

Referring to FIG. 1, the wireless charging system includes a wireless power transmitter 100 and one or more wireless power receivers 110-1, 110-2, . . . , and 110-*n*.

The wireless power transmitter 100 may wirelessly transmit power 1-1, 1-2, . . . , and 1-*n* respectively to the wireless power receivers 110-1, 110-2, . . . , and 110-*n*.

The wireless power transmitter 100 may establish electrical connections to the wireless power receivers 110-1, 110-2, . . . , and 110-*n*. For example, the wireless power transmitter 100 may transmit wireless power by radiating an electromagnetic field or a magnetic field. The wireless power transmitter 100 may transmit wireless power in an induction scheme or a resonance scheme.

The wireless power transmitter 100 may conduct bi-directional communication with the wireless power receivers 110-1, 110-2, . . . , and 110-*n*. In the case of outband communication, the wireless power transmitter 100 and the wireless power receivers 110-1, 110-2, . . . , and 110-*n* may process or transmit/receive packets 2-1, 2-2, . . . , and 2-*n* configured in predetermined frames. A wireless power receiver may be configured, particularly as a mobile communication terminal, a personal digital assistant (PDA), a personal multimedia player (PMP), a smartphone, a wearable electronic device, a small home appliance such as a mobile music player, a large home appliance such as a refrigerator and a television (TV), an electronic vehicle, or the like. In the case of inband communication, the wireless power receivers 110-1, 110-2, . . . , and 110-*n* may perform load modulation, and the wireless power transmitter 100 may acquire reports of the wireless power receivers 110-1, 110-2, . . . , and 110-*n* by detecting load changes.

The wireless power transmitter 100 may supply power wirelessly to a plurality of wireless power receivers 110-1, 110-2, . . . , and 110-*n*. For example, the wireless power transmitter 100 may transmit power to the plurality of wireless power receivers 110-1, 110-2, . . . , and 110-*n* by resonance. If the wireless power transmitter 100 adopts the resonance scheme, the wireless power transmitter 100 may be apart from the wireless power receivers 110-1, 110-2, . . . , and 110-*n* by a distance enough for indoor operation. On the other hand, if the wireless power transmitter 100 adopts an electromagnetic induction scheme, the distance between the wireless power transmitter 100 and the wireless power receivers 110-1, 110-2, . . . , and 110-*n* may be preferably 10 cm or smaller. If the wireless power transmitter 100 adopts a radio frequency (RF)/microwave scheme, the wireless power transmitter 100 may form a directional microwave power beam and thus charge at least one of the wireless power receivers 110-1, 110-2, . . . , and 110-*n* with the microwave power beam.

The wireless power receivers 110-1, 110-2, . . . , and 110-*n* may receive wireless power from the wireless power transmitter 100 and charge their internal batteries with the wires power. Further, the wireless power receivers 110-1, 110-2, . . . , and 110-*n* may transmit to the wireless power transmitter 100 a signal requesting wireless power transmission, information required for wireless power reception, wireless power receiver state information, or control information for the wireless power transmitter 100.

Each of the wireless power receivers 110-1, 110-2, . . . , and 110-*n* may also transmit a message indicating its charged state to the wireless power transmitter 100 in an inband or outband scheme.

The wireless power transmitter 100 may include a display means such as a display, and display the state of each wireless power receiver based on the messages received from the wireless power receivers 110-1, 110-2, . . . , and 110-*n*. Further, the wireless power transmitter 100 may display a time expected until each of the wireless power receivers 110-1, 110-2, . . . , and 110-*n* is completely charged.

Figure 2:
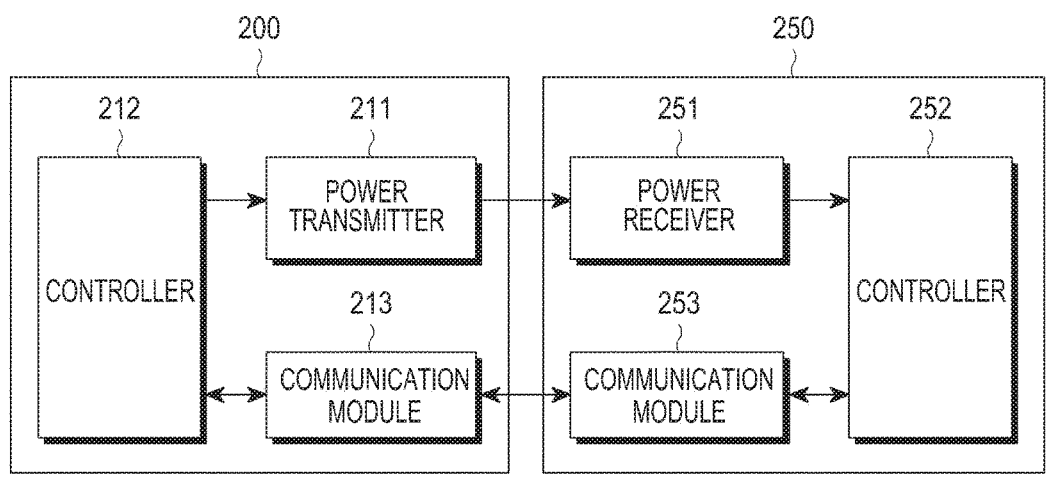
FIG. 2 is a block diagram illustrating a wireless power transmitter and a wireless power receiver according to an embodiment of the present disclosure.

FIG. 2 is a block diagram illustrating a wireless power transmitter and a wireless power receiver according to an embodiment of the present disclosure.

Referring to FIG. 2, a wireless power transmitter 200 may include a power transmitter 211, a controller 212, and a communication module 213. A wireless power receiver 250 may include a power receiver 251, a controller 252, and a communication module 253.

The power transmitter 211 may supply power to the wireless power receiver 250. The power transmitter 211 may radiate an electromagnetic field or a magnetic field in the resonance, induction, or RF/microwave scheme. The power transmitter 211 may further include a resonant circuit or an induction circuit and thus transmit or receive predetermined electromagnetic waves. If the power transmitter 211 is configured as a resonant circuit, the inductance L of a loop coil in the resonant circuit may be changed. Meanwhile, those skilled in the art will readily understand that as far as it may transmit an electromagnetic field or a magnetic field, any means is available as the power transmitter 211.

The controller 212 may provide overall control to the wireless power transmitter 200. The controller 212 of the wireless power transmitter 200 or the controller 252 of the wireless power receiver 250 may control an overall operation of the wireless power transmitter 200 or the wireless power receiver 250 using an algorithm, a program, or an application required for a control operation, read from a memory (not shown).

The communication module 213 may communicate with the wireless power receiver 250 or another electronic device in a predetermined communication scheme. The communication module 213 may communicate with the communication module 253 of the wireless power receiver 250 by near field communication (NFC), ZigBee communication, infrared communication, visible ray communication, Bluetooth communication, Bluetooth low energy (BLE) communication, or magnetic secure transfer (MST) communication. However, these communication schemes are purely exemplary, and the scope of the embodiments of the present disclosure is not limited to a specific communication scheme conducted by the communication module 213.

The power receiver 251 may receive wireless power from the power transmitter 211 in the induction, resonance, or RF/microwave scheme.

Figure 3A:
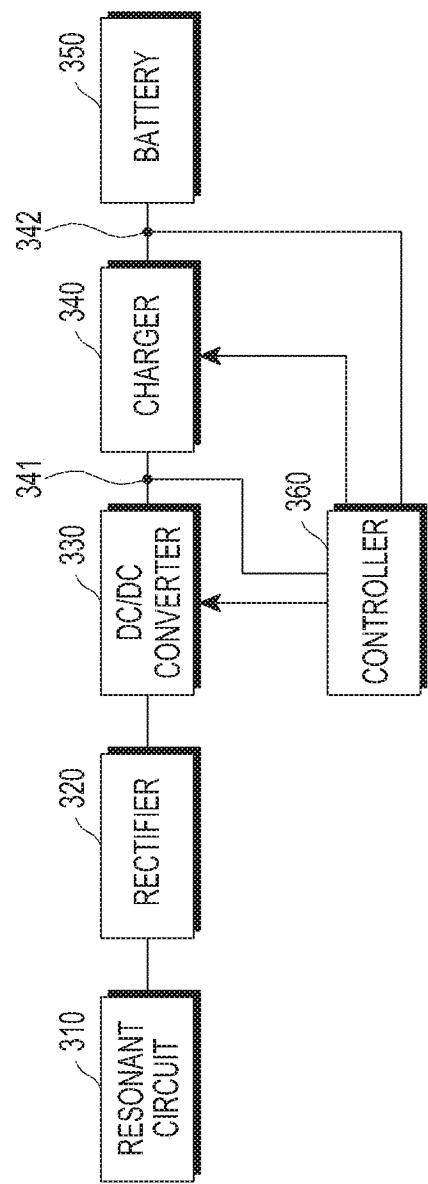
FIG. 3A is a block diagram illustrating a wireless power receiver according to various embodiments of the present disclosure.

FIG. 3A is a block diagram of a wireless power receiver according to various embodiments of the present disclosure. The wireless power receiver according to various embodiments of the present disclosure may include a resonant circuit 310, a rectifier 320, a direct current/direct current (DC/DC) converter 330, a charger 340, a battery 350, and a controller 360.

Referring to FIG. 3A, the resonant circuit 310 may receive electromagnetic waves radiated from a wireless power transmitter and output the electromagnetic waves to the rectifier 320. The resonant circuit 310 may include at least one coil and at least one capacitor. The resonant circuit 310 may be designed to have the resonant frequency of electromagnetic waves radiated from the wireless power transmitter. For example, if the wireless power transmitter and the wireless power receiver conform to the alliance for wireless power (A4WP) standard, the resonant circuit 310 may be designed to have a resonant frequency of 6.78 MHz. The resonant circuit 310 may receive electromagnetic waves and output power in an alternate current (AC) to the rectifier 320.

Meanwhile, the wireless power receiver according to various embodiments of the present disclosure may receive power in the induction scheme. In this case, the wireless power receiver may include a resonant circuit or coil conforming to the wireless power consortium (WPC) standard.

The rectifier 320 may rectify the received AC power to DC power. The rectifier 320 may be configured in the form of, but not limited to, for example, a bridge diode. The DC/DC converter 330 may convert the rectified DC power with a predetermined gain. For example, the DC/DC converter 330 may convert the rectified DC power so that voltage at its output end 341 may have a predetermined voltage value. Meanwhile, a minimum voltage value and a maximum voltage value may be preset, for application to a front end of the DC/DC converter 330.

The charger 340 may charge the battery 350. Voltage at an output end of the charger 340, that is, voltage at an input end 342 of the battery 350 may be different from the voltage at the output end 341 of the DC/DC converter 330. The battery 350 may be charged by storing power supplied by the charger 340. While the battery 350 is shown as included in the wireless power receiver, this is purely exemplary. The battery 350 may be detachably mounted to the wireless power receiver. The charger 340 may charge the battery 350 in a constant current (CC) mode or constant voltage (CV) mode. Hereinafter, the CC mode or CV mode may be referred to as a mode of the battery 350.

Figure 4A:
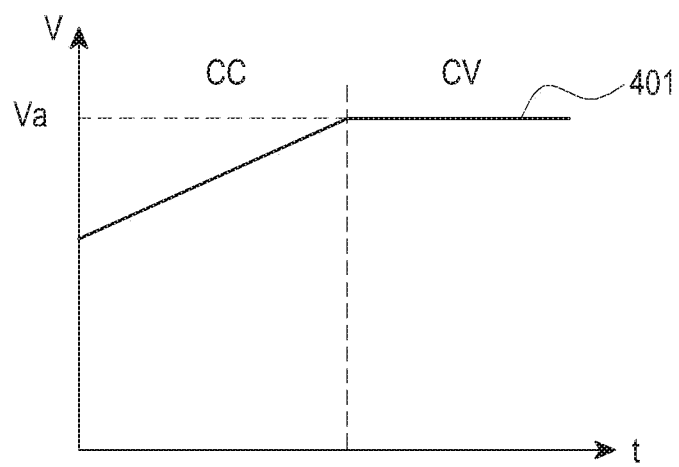
FIGS. 4A and 4B are graphs illustrating current versus voltage at an input end of a battery in a wireless power receiver according to various embodiments of the present disclosure.
Figure 4B:
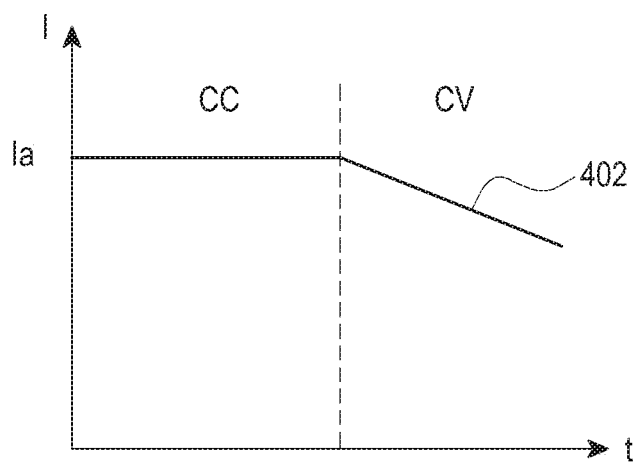

FIGS. 4A and 4B are graphs illustrating current versus voltage at the input end 342 of the battery 350 in the wireless power receiver in a comparison example to be compared with the present disclosure according to an embodiment of the present disclosure.

Referring to FIG. 4A, voltage 401 at the input end 342 of the battery 350 may be different in the CC mode and the CV mode. The CC mode of the battery 350 may correspond to a case in which the battery 350 has relatively low remaining power. When the battery 350 has relatively low remaining power, the charger 340 may charge the battery 350 with maximum allowed current (for example, Ia). In the CC mode of the battery 350, current 402 at the input end 342 of the battery 350 may be kept at a predetermined value (for example, Ia) and the voltage 401 at the input end 342 of the battery 350 may be increased.

In the CC mode of the battery 350, as the voltage 401 at the input end 342 of the battery 350 increases, the voltage 401 may reach a maximum allowed voltage value (for example, Va). In the CV mode of the battery 350, if the voltage 401 at the input end 342 of the battery 350 reaches the maximum allowed voltage value, the charger 340 may keep the voltage 401 at a predetermined value (for example, Va). In this case, the current 402 may be decreased.

Figure 5A:
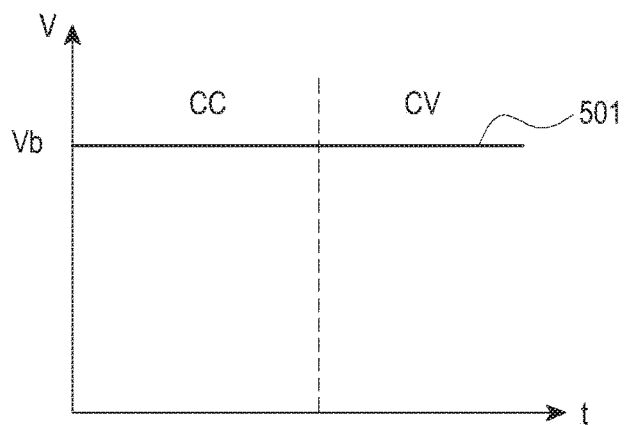
FIG. 5A is a graph illustrating voltage at an output end of a direct current/direct current (DC/DC) converter, when a controller does not output a control signal according to an embodiment of the present disclosure.

FIG. 5A is a graph illustrating voltage at the output end 341 of the DC/DC converter 330 in a comparison example according to an embodiment of the present disclosure.

Referring to FIG. 5A, voltage 501 at the output end 341 of the DC/DC converter 330 may be kept at a predetermined value (for example, Vb). The DC/DC converter 330 may convert the voltage of input power to predetermined voltage, and thus the voltage 501 may be kept at a predetermined value in both the CC mode and the CV mode of the battery 350.

Figure 5B:
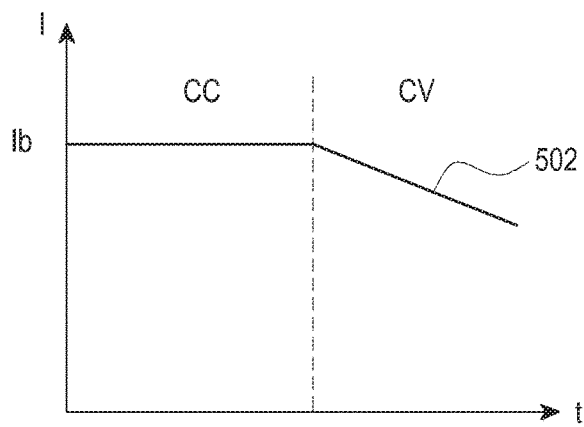
FIG. 5B is a graph illustrating current at an output end of a DC/DC converter, when a controller does not output a control signal according to an embodiment of the present disclosure.

FIG. 5B is a graph illustrating current at the output end 341 of the DC/DC converter 330 in a comparison example according to an embodiment of the present disclosure.

Referring to FIG. 5B, current 502 at the output end 341 of the DC/DC converter 330 may be kept at a predetermined value (for example, Ib) in the CC mode of the battery 350 and decreased in the CV mode of the battery 350.

Figure 5C:
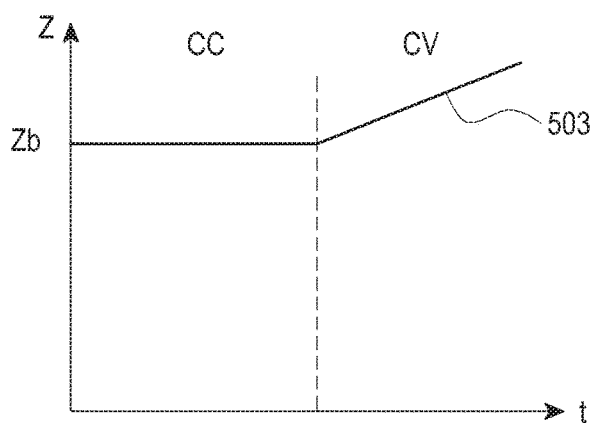
FIG. 5C is a graph illustrating impedance at an output end of a DC/DC converter, when a controller does not output a control signal according to an embodiment of the present disclosure.

FIG. 5C is a graph illustrating impedance at the output end 341 of the DC/DC converter 330 in a comparison example according to an embodiment of the present disclosure.

Referring to FIG. 5C, impedance 503 may be kept at a predetermined value (for example, Zb) in the CC mode of the battery 350. Because the voltage (for example, Vb) and current (for example, Ia) at the output end 341 of the DC/DC converter 330 are constant in the CC mode of the battery 350, the impedance may also be kept at a predetermined value.

The impedance 503 at the output end 341 of the DC/DC converter 330 may increase in the CV mode of the battery 350. In the CV mode of the battery 350, the voltage (for example, Vb) at the output end 341 of the DC/DC converter 330 is constant, whereas the current (for example, Ia) at the output end 341 of the DC/DC converter decreases. As a result, the impedance 503 at the output end 341 of the DC/DC converter 330 may increase in the CV mode of the battery 350.

As described above, the impedance 503 at the output end 341 of the DC/DC converter 330 may be changed from a time of switching from the CC mode of the battery 350 to the CV mode of the battery 350. For example, the impedance 530 at the output end 341 of the DC/DC converter 330 may have a value for impedance matching with a wireless power transmitter during operation and relatively high charging efficiency may be achieved in the CC mode of the battery 350. On the other hand, as the impedance 530 at the output end 341 of the DC/DC converter 330 has a value different from the value for impedance matching in the CV mode of the battery 350, the resulting impedance mismatching may decrease the charging efficiency.

As described above, if the controller 360 does not control the DC/DC converter 330, the impedance at the output end 341 of the DC/DC converter 330 may be changed, thus reducing wireless charging efficiency.

Figure 3B:
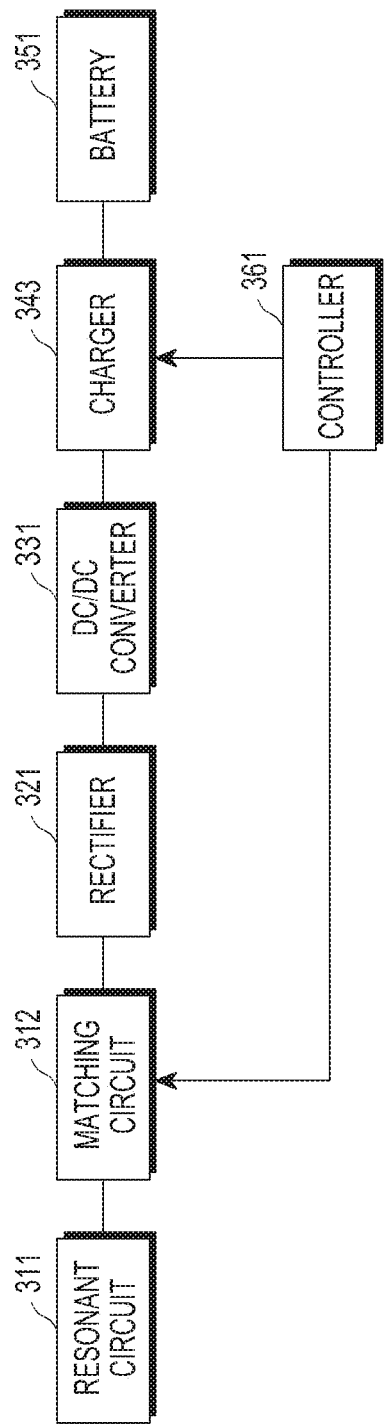
FIG. 3B is a block diagram illustrating a comparison example compared with the present disclosure according to an embodiment of the present disclosure.

FIG. 3B is a block diagram illustrating a comparison example compared with the present disclosure according to an embodiment of the present disclosure.

Referring to FIG. 3B, a wireless power receiver in a comparison example may include a resonant circuit 311, a matching circuit 312, a rectifier 321, a DC/DC converter 331, a charger 343, a battery 351, and a controller 361.

The matching circuit 312 may adjust impedance under control of the controller 361. The matching circuit 312 may include at least one of a coil and a capacitor. The controller 361 may control a connection state with respect to at least one of the coil and the capacitor and perform impedance matching accordingly.

Meanwhile, since the wireless power receiver in the comparison example of FIG. 3B includes the matching circuit 312, the wireless power receiver increases in weight and volume, thus having a reduced mounting area. According to various embodiments of the present disclosure, a wireless power receiver may keep impedance at a predetermined value without including the matching circuit 312 and thus maintain relatively high charging efficiency.

Figure 6:
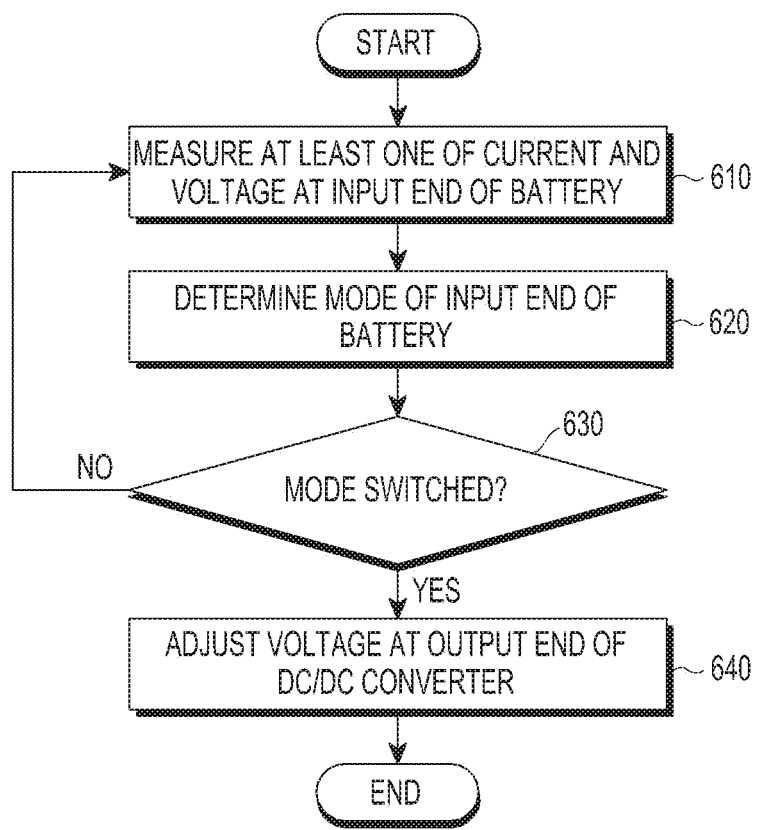
FIG. 6 is a flowchart illustrating a method for controlling a wireless power receiver according to various embodiments of the present disclosure.

FIG. 6 is a flowchart illustrating a method for controlling a wireless power receiver according to various embodiments of the present disclosure.

Referring to FIG. 6, the wireless power receiver may measure at least one of current and voltage at the input end 342 of the battery 350 in operation 610. In operation 620, the wireless power receiver may determine the mode of the battery 350. For example, if the voltage at the input end 342 of the battery 350 has a predetermined value, the wireless power receiver may determine the charging mode of the battery 350 to be the CV mode of the battery 350. A specific voltage value may be predetermined per battery 350, and the wireless power receiver may pre-store the predetermined voltage value per battery 350. For example, if the current at the input end 342 of the battery 350 has a predetermined value, the wireless power receiver may determine the charging mode of the battery 350 to be the CC mode of the battery 350. A specific current value may be predetermined per battery 350, and the wireless power receiver may pre-store the predetermined current value per battery 350. Meanwhile, if the current at the input end 342 of the battery 350 does not have the predetermined value, the wireless power receiver may determine the charging mode of the battery 350 to be the CV mode of the battery 350.

In operation 630, the wireless power receiver may determine whether the mode of the battery 350 has been switched. More specifically, if the wireless power receiver detects that the voltage at the input end 342 of the battery 350 has a predetermined value, the wireless power receiver may determine that the mode of the battery 350 has been switched. Or if the wireless power receiver detects that the current at the input end 342 of the battery 350 does not have a predetermined value, the wireless power receiver may determine that the mode of the battery 350 has been switched.

In operation 640, the wireless power receiver may adjust voltage at the output end 341 of the DC/DC converter 330. For example, the wireless power receiver may adjust the voltage at the output end 341 of the DC/DC converter 330, as illustrated in FIG. 7A.

Figure 7A:
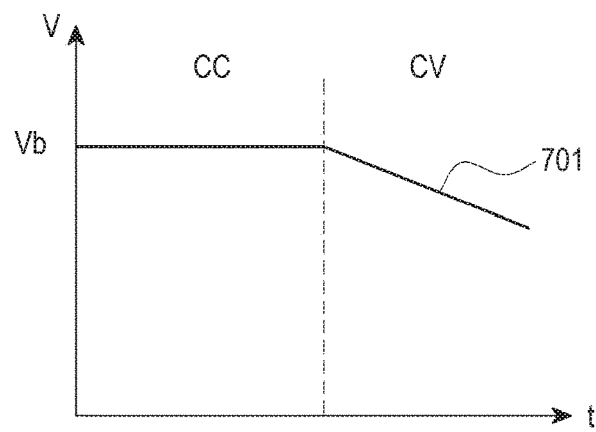
FIGS. 7A to 7C are graphs illustrating electrical characteristics, when voltage at an output end of a DC/DC converter is adjusted according to various embodiments of the present disclosure.
Figure 7B:
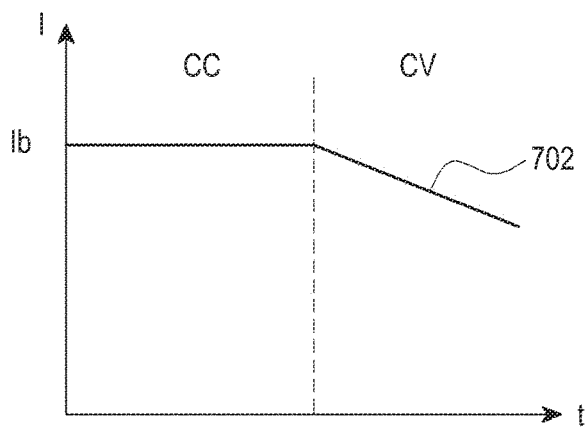
Figure 7C:
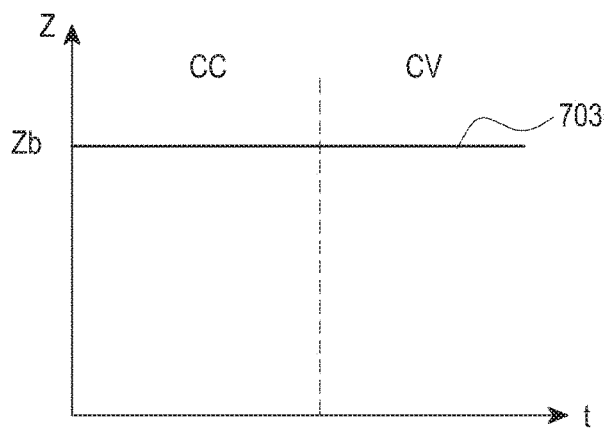

FIGS. 7A to 7C are graphs illustrating electrical characteristics, when voltage at an output end of a DC/DC converter is adjusted according to various embodiments of the present disclosure.

Referring to FIG. 7A, the wireless power receiver may decrease voltage 701 at the output end 341 of the DC/DC converter 330. FIG. 7B illustrates current 702 at the output end 341 of the DC/DC converter 330. As noted from FIGS. 7A and 7B, both the voltage 701 and current 702 at the output end 341 of the DC/DC converter 330 are decreased. Therefore, as illustrated in FIG. 7C, impedance 703 at the output end 341 of the DC/DC converter 330 may be kept constant even in the CV mode of the battery 350. That is, the impedance 703 at the output end 341 of the DC/DC converter 330 may be kept constant in the CC mode and CV mode of the battery 350. As described before, the impedance 703 at the output end 341 of the DC/DC converter 330 may have a value for impedance matching with a wireless power transmitter. As impedance matching is maintained, the decrease of charging efficiency may be prevented, which might otherwise be caused by impedance mismatching. That is, it is possible to maintain relatively high charging efficiency.

The controller 360 may include one or more of a CPU, an AP, a communications processor (CP), a graphics processor (GP), a multi-chip package (MCP) processor, and an image processor (IP). The controller 360 may, for example, perform computation or data processing related to control and/or communication of one or more other components of the wireless power receiver. The controller 360 may detect various events indicating a change in the impedance at the output end 341 of the DC/DC converter 330 and may adjust the voltage at the output end 341 of the DC/DC converter 330 in response to the event detection. For example, switching of the charging mode of the battery 350 may be one of events indicating a change in the impedance at the output end 341 of the DC/DC converter 330. The controller 360 may detect switching of the charging mode of the battery 350 and adjust the voltage at the output end 341 of the DC/DC converter 330, to thereby keep the impedance at the output end 341 of the DC/DC converter 330 constant. The controller 360 may keep the impedance at the output end 341 of the DC/DC converter 330 constant by detecting that the voltage at the input end 342 of the battery 350 has a predetermined value. The controller 360 may keep the impedance at the output end 341 of the DC/DC converter 330 constant by detecting that the current at the input end 342 of the battery 350 does not have a predetermined value. Conditions for switching of the charging mode of the battery 350 and the voltage or current at the input end 342 of the battery 350 are examples of an event indicating a change in the impedance at the output end 341 of the DC/DC converter 330. Various embodiments of the event will be described later in greater detail.

While the voltage 701 at the output end 341 of the DC/DC converter 330 is shown as linearly decreased in the embodiment of FIG. 7A, this is purely exemplary. In various embodiments of the present disclosure, the wireless power receiver may decrease the voltage 701 at the output end 341 of the DC/DC converter 330 linearly or stepwise. Also, while the voltage 701 at the output end 341 of the DC/DC converter 330 is shown as decreased in the embodiment of FIG. 7A, this is purely exemplary. In various embodiments of the present disclosure, the wireless power receiver may increase or repeat the increase and decrease of the voltage 701 at the output end 341 of the DC/DC converter 330.

In various embodiments of the present disclosure, the controller 360 may output a control signal to the DC/DC converter 330, and the DC/DC converter 330 may decrease the voltage 701 at the output end 341 of DC/DC converter 330 according to the control signal. The control signal may include at least one of gain information and information about voltage at the output end 341 of the DC/DC converter 330, and the DC/DC converter 330 may decrease the voltage 701 at the output end 341 using the information carried by the control signal, for example, the at least one of the gain information and the information about voltage at the output end.

As described above, when the charging mode of the battery 350 switches from the CC mode to the CV mode, the wireless power receiver according to various embodiments of the present disclosure may decrease the voltage at the output end 341 of the DC/DC converter 330, thus keeping the impedance at the output end 341 of the DC/DC converter 330 constant. The impedance at the output end 341 of the DC/DC converter 330 may have a value for impedance matching with a wireless power transmitter. Accordingly, with the resulting impedance matching, relatively high charging efficiency may be maintained.

Now, a detailed description will be given of an operation for controlling the DC/DC converter 330 by the controller 360.

In various embodiments of the present disclosure, the controller 360 may generate a control signal for the DC/DC converter 330 and output the control signal to the DC/DC converter 330. The control signal may include at least one of information about a gain of the DC/DC converter 330 and information about voltage at the output end 341 of the DC/DC converter 330. The control signal may be configured so that impedance output end 341 of the DC/DC converter 330 may have a predetermined value. For example, the controller 360 may generate a control signal, referring to information about a relationship between voltage at the input end 342 of the battery 350 and information of the control signal. Or the controller 360 may generate a control signal, referring to information about a relationship between current at the input end 342 of the battery 350 and information of the control signal.

Tables 1 and 2 illustrate an example of information about a relationship between current at the input end 342 of the battery 350 and information of a control signal.

TABLE 1

| Current at the input end of the battery | Information about gain of the DC/DC converter |
|---|---|
| I_bat1 | gain_1 |
| I_bat2 | gain_2 |

TABLE 1-continued

| Current at the input end of the battery | Information about gain of the DC/DC converter |
|---|---|
| I_bat3 | gain_3 |
| I_bat4 | gain_4 |
| I_bat5 | gain_5 |

TABLE 2

| Current at the input end of the battery | Voltage at the output end of the DC/DC converter |
|---|---|
| I_bat1 | Vo_1 |
| I_bat2 | Vo_2 |
| I_bat3 | Vo_3 |
| I_bat4 | Vo_4 |
| I_bat5 | Vo_5 |

As illustrated in Tables 1 and 2, the wireless power receiver may pre-store information about current at the input end 342 of the battery 350 and various pieces of information (for example, gain or voltage at the output end 341 of the DC/DC converter 330) of a control signal. For example, if a measurement of the current at the input end 342 of the battery 350 is I_bat3, the controller 360 may output a control signal including information about a gain "gain_3" to the DC/DC converter 330. For example, the DC/DC converter 330 may convert voltage of the input end to voltage of the output end based on the gain, gain_3. The voltage of the output end may be the product between the voltage of the input end and the gain. The DC/DC converter 330 may adjust a gain to gain_3 based on the received control signal and convert the voltage of input power with the gain, gain_3. For example, voltage at the output end 341 of the DC/DC converter 330 may be vol_3 which may keep the impedance at the output end 341 of the DC/DC converter 330 constant.

The above description has been given of a wireless power receiver that measures the value of current or voltage at the input end 341 of the battery 350, determines mode switching of the battery 350 based on the measurement, and adjusts voltage at the output end 341 of the DC/DC converter 330 based on the mode switching. However, this is purely exemplary, and the voltage at the output end 341 of the DC/DC converter 330 may be adjusted based on electrical information about various points including the input end 341 of the battery 350 in various embodiments of the present disclosure. The above-described mode switching of the battery 350 is an example indicating an impedance change in the output end of the DC/DC converter 330. According to various embodiments of the present disclosure, the wireless power receiver may adjust the voltage at the output end 341 of the DC/DC converter 330 by detecting various events indicating an impedance change at the output end 341 of the DC/DC converter 330. Hereinbelow, various events indicating an impedance change at the output end 341 of the DC/DC converter 330 will be described.

Figure 8A:
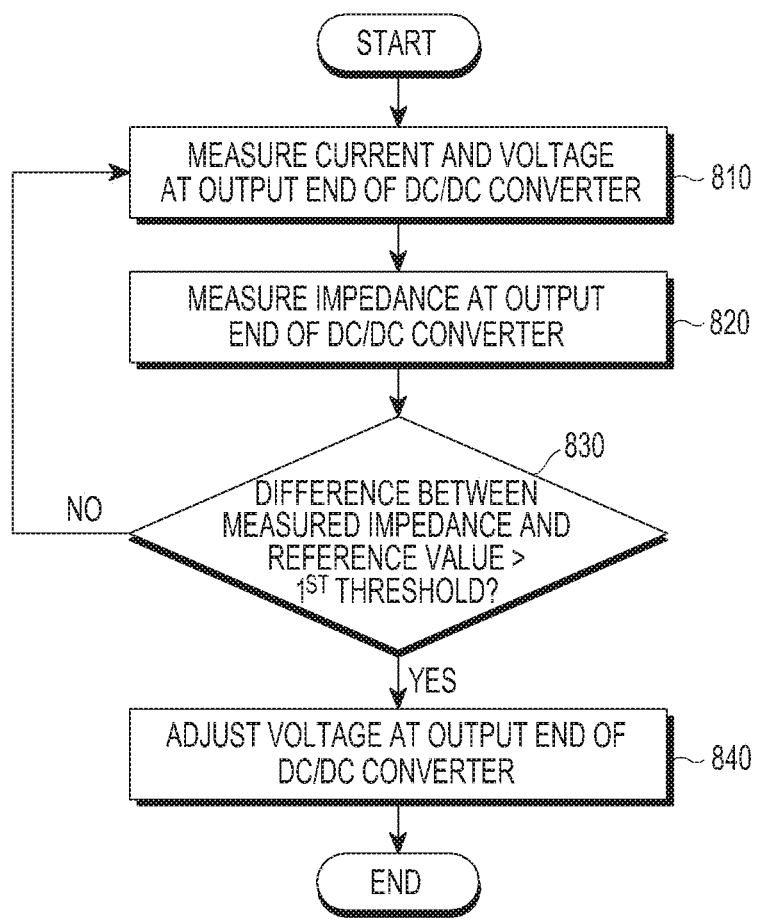
FIGS. 8A and 8B are flowcharts illustrating methods for controlling a wireless power receiver according to various embodiments of the present disclosure.
Figure 8B:
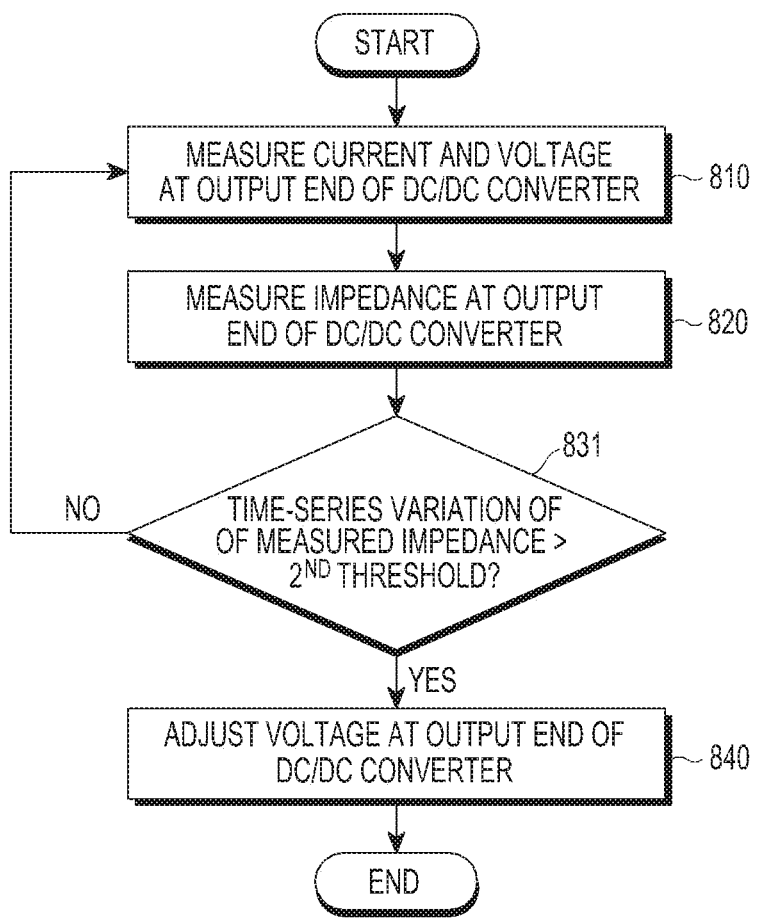

FIGS. 8A and 8B are flowcharts illustrating methods for controlling a wireless power receiver according to various embodiments of the present disclosure.

Referring to FIG. 8A, the wireless power receiver may measure current and voltage at the output end of the DC/DC converter in operation 810. In operation 820, the wireless power receiver may measure impedance at the output end of the DC/DC converter. The wireless power receiver may measure the impedance by dividing the value of the voltage at the output end of the DC/DC converter by the value of the current at the output end of the DC/DC converter. That is, the wireless power receiver may directly measure the impedance at the output end of the DC/DC converter, as an event indicating an impedance change at the output end of the DC/DC converter.

In operation 830, the wireless power receiver may determine whether the difference between the measured impedance and a reference value exceeds a first threshold. The wireless power receiver may store the reference value. In various embodiments of the present disclosure, the reference value may be a value calculated by dividing the voltage at the output end 341 of the DC/DC converter 330 in the CC mode of the battery 350 by the current at the output end 341 of the DC/DC converter 330 in the CC mode of the battery 350. Particularly, the reference value may be a value used for detecting an impedance change. Meanwhile, when the battery 350 switches from the CC mode to the CV mode or an abrupt change occurs during fast charging, the impedance at the output end 341 of the DC/DC converter 330 may have a value different from the reference value. If the wireless power receiver determines that the impedance at the output end 341 of the DC/DC converter 330 has a value different from the reference value, the wireless power receiver may adjust the voltage at the output end 341 of the DC/DC converter 330. For example, if the impedance at the output end 341 of the DC/DC converter 330 is larger than the reference value, the wireless power receiver may decrease the voltage at the output end 341 of the DC/DC converter 330. For example, if the impedance at the output end 341 of the DC/DC converter 330 is smaller than the reference value, the wireless power receiver may increase the voltage at the output end 341 of the DC/DC converter 330. As a consequence, the impedance at the output end 341 of the DC/DC converter 330 may be kept constant, thus maintaining relatively high wireless charging efficiency without a matching circuit.

FIG. 8B is a flowchart illustrating a method for controlling a wireless power receiver according to various embodiments of the present disclosure.

Referring to FIG. 8B, the wireless power receiver may measure current and voltage at the output end 341 of the DC/DC converter 330 in operation 810. In operation 820, the wireless power receiver may measure impedance at the output end 341 of the DC/DC converter 330. The wireless power receiver may measure the impedance by dividing the value of the voltage at the output end 341 of the DC/DC converter 330 by the value of the current at the output end 341 of the DC/DC converter 330.

In operation 831, the wireless power receiver may determine whether a time-series variation of the measured impedance exceeds a second threshold. The second threshold may be a value set to determine an abrupt change in the impedance. Thus, a relatively slight change of the impedance may be neglected. If the time-series variation of the impedance at the output end 341 of the DC/DC converter 330 exceeds the second threshold, that is, upon detection of an abrupt change in the impedance at the output end 341 of the DC/DC converter 330, the wireless power receiver may adjust the voltage at the output end 341 of the DC/DC converter 330 in operation 840. For example, if the measured impedance is larger than previous measured impedance, the wireless power receiver may decrease the voltage at the output end 341 of the DC/DC converter 330. For example, if the measured impedance is smaller than the previous measured impedance, the wireless power receiver may increase the voltage at the output end 341 of the DC/DC converter 330. As a consequence, the impedance at the output end 341 of the DC/DC converter 330 may be kept constant, thus maintaining relatively high wireless charging efficiency without a matching circuit.

Figure 9:
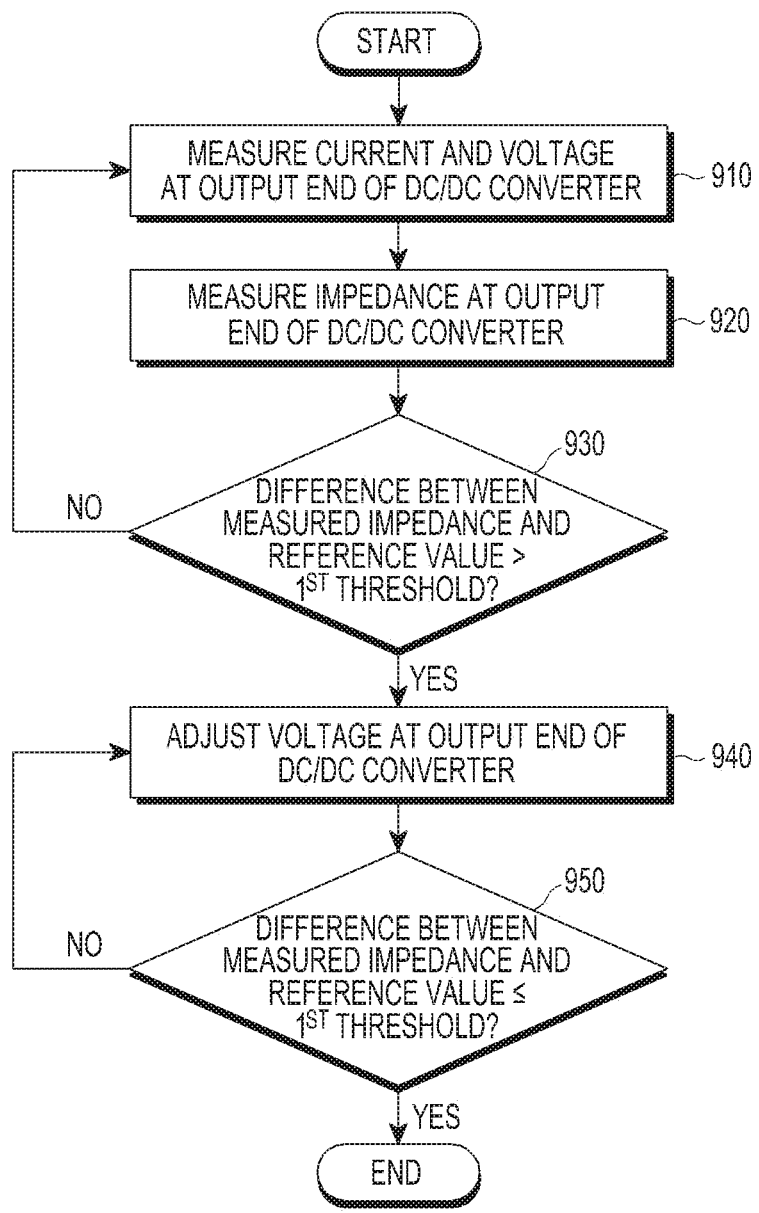
FIG. 9 is a flowchart illustrating an operation of a wireless power receiver according to various embodiments of the present disclosure.

FIG. 9 is a flowchart illustrating an operation of a wireless power receiver according to various embodiments of the present disclosure.

Referring to FIG. 9, the wireless power receiver may measure current and voltage at the output end 341 of the DC/DC converter 330 in operation 910. In operation 920, the wireless power receiver may measure impedance at the output end 341 of the DC/DC converter 330. The wireless power receiver may measure the impedance by dividing the value of the voltage at the output end 341 of the DC/DC converter 330 by the value of the current at the output end 341 of the DC/DC converter 330. In operation 930, the wireless power receiver may determine whether the difference between the measured impedance and a reference value exceeds a first threshold. If the difference between the measured impedance and the reference value exceeds the first threshold, the wireless power receiver may adjust the voltage at the output end 341 of the DC/DC converter 330 in operation 940.

After adjusting the voltage at the output end 341 of the DC/DC converter 330, the wireless power receiver may determine whether the difference between the measured impedance and the reference value is equal to or smaller than the first threshold in operation 950. If the difference between the measured impedance and the reference value still exceeds the first threshold, the wireless power receiver may re-adjust the voltage at the output end 341 of the DC/DC converter 330. The wireless power receiver may re-adjust the voltage at the output end 341 of the DC/DC converter 330 until the difference between the measured impedance and the reference value is equal to or smaller than the first threshold.

Figure 10:
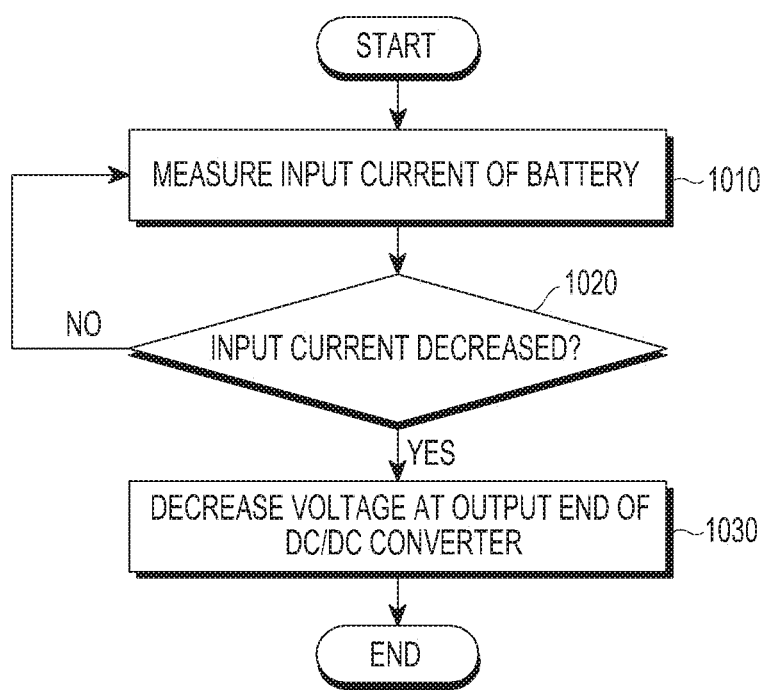
FIG. 10 is a flowchart illustrating a method for controlling a wireless power receiver according to various embodiments of the present disclosure.

FIG. 10 is a flowchart illustrating a method for controlling a wireless power receiver according to various embodiments of the present disclosure.

Referring to FIG. 10, the wireless power receiver may measure current at the input end 342 of the battery 350 in operation 1010, and determine whether the current at the input end 342 of the battery 350 has been decreased in operation 1020. As described before, the current at the input end 342 of the battery 350 may be decreased after the battery 350 switches from the CC mode to the CV mode. Impedance at the output end 341 of the DC/DC converter 330 may also be changed from a time of mode switching, that is, from a time when the current at the input end 342 of the battery 350 decreases. Thus, the wireless power receiver may determine whether the impedance at the output end 341 of the DC/DC converter 330 has been changed according to the determination made as to whether the current at the input end 342 of the battery 350 has been decreased. The wireless power receiver may measure the current at the input end 342 of the battery 350 with the passage of time, and determine whether the current at the input end 342 of the battery 350 has been changed by comparing the measured current with a previous measurement of the current at the input end 342 of the battery 350. Or the wireless power receiver may determine whether the current at the input end 342 of the battery 350 has been decreased by checking whether the current at the input end 342 of the battery 350 does not have a predetermined value.

If the wireless power receiver determines that the current at the input end 342 of the battery 350 has been decreased, the wireless power receiver may decrease the voltage at the output end 341 of the DC/DC converter 330 in operation 1030. As described before, when the current at the input end 342 of the battery 350 decreases, the current at the output end 341 of the DC/DC converter 330 also decreases. Therefore, the impedance at the output end 341 of the DC/DC converter 330 may be changed. According to various embodiments of the present disclosure, the wireless power receiver may keep the impedance at the output end 341 of the DC/DC converter 330 constant by decreasing the voltage at the output end 341 of the DC/DC converter 330.

Figure 11:
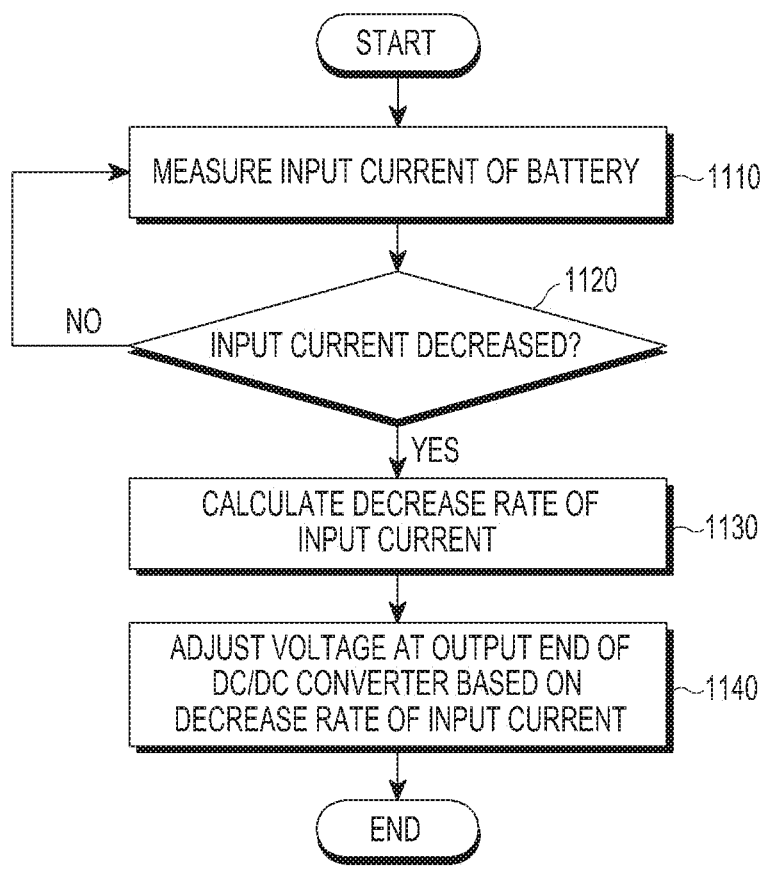
FIG. 11 is a flowchart illustrating an operation of a wireless power receiver according to various embodiments of the present disclosure.

FIG. 11 is a flowchart illustrating an operation of a wireless power receiver according to various embodiments of the present disclosure.

Referring to FIG. 11, the wireless power receiver may measure current at the input end 342 of the battery 350 in operation 1110, and determine whether the current at the input end 342 of the battery 350 has been decreased in operation 1120. The wireless power receiver may measure the current at the input end 342 of the battery 350 with the passage of time, and determine whether the current at the input end 342 of the battery 350 has been decreased by comparing the measured current with a previous measurement of the current at the input end 342 of the battery 350.

In operation 1130, the wireless power receiver may calculate a decrease rate of the current at the input end 342 of the battery 350. The wireless power receiver may measure the current at the input end 342 of the battery 350 with the passage of time, and calculate the decrease rate of the current at the input end 342 of the battery 350 by dividing a decrement of the current at the input end 342 of the battery 350 by the amount of time.

In operation 1140, the wireless power receiver may adjust voltage at the output end 341 of the DC/DC converter 330 based on the decrease rate of the current at the input end 342 of the battery 350. The wireless power receiver may decrease the voltage at the output end 341 of the DC/DC converter 330 so that impedance at the output end 341 of the DC/DC converter 330 may have a predetermined value. For example, if the wireless power receiver determines that the decrease rate of the current at the input end 342 of the battery 350 is s, the wireless power receiver may also decrease the voltage at the output end 341 of the DC/DC converter 330 at the rate of s. For example, it is assumed that impedance Zo_1 at the output end 341 of the DC/DC converter 330 is Vo_1/Io_1 where Vo_1 is voltage at the output end 341 of the DC/DC converter 330 and Io_1 is current at the output end 341 of the DC/DC converter 330. As described before, the current at the input end 342 of the battery 350 may decrease from I_bat_1 to s×I_bat_1 where s is a current decrease rate, determined by I_bat_2/I_bat_1 and I_bat_2 is the measured current at the input end 342 of the battery 350, determined by s×I_bat_1. In this case, the current at the output end 341 of the DC/DC converter 330 may decrease from Io_1 to s×Io_1. The wireless power receiver may keep the impedance Zo_1 of the DC/DC converter 330 at Vo_1/Io_1 by decreasing the voltage at the output end 341 of the DC/DC converter 330 to s×Vo_1.

According to various embodiments of the present disclosure, the wireless power receiver may determine whether voltage at the input end 342 of the battery 350 has reached a predetermined value, as an event indicating a change in the impedance at the output end 341 of the DC/DC converter 330.

Figure 12:
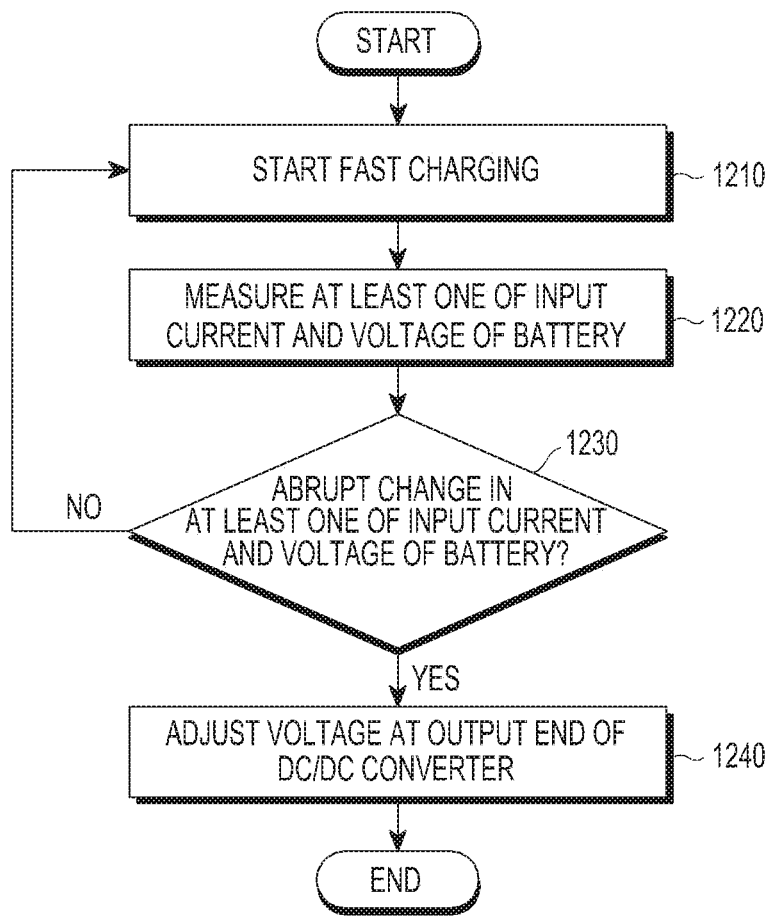
FIG. 12 is a flowchart illustrating an operation of a wireless power receiver according to various embodiments of the present disclosure.

FIG. 12 is a flowchart illustrating an operation of a wireless power receiver according to various embodiments of the present disclosure. With reference to FIGS. 13A to 13D, the embodiment of FIG. 12 will be described in great detail. FIGS. 13A to 13D are graphs illustrating electrical characteristics of various points in the wireless power receiver according to various embodiments of the present disclosure.

Referring to FIG. 12, in operation 1210, the wireless power receiver may start fast charging. The wireless power receiver may measure at least one of current and voltage at the input end 342 of the battery 350 in operation 1220.

FIGS. 13A to 13D are graphs illustrating current, voltage, power, and impedance at the input end 342 of the battery 350.

Figure 13A:
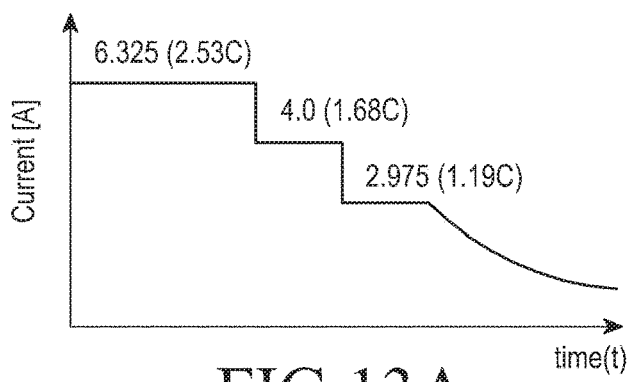
FIGS. 13A to 13D are graphs illustrating electrical characteristics at various points of a wireless power receiver according to various embodiments of the present disclosure.

Referring to FIG. 13A, the current at the input end 342 of the battery 350 may be kept at 6.325 A in a first period, changed to 4.2 A in a second period, kept at 2.975 A in a third period, and then decreased in a fourth period, during fast charging.

Figure 13B:
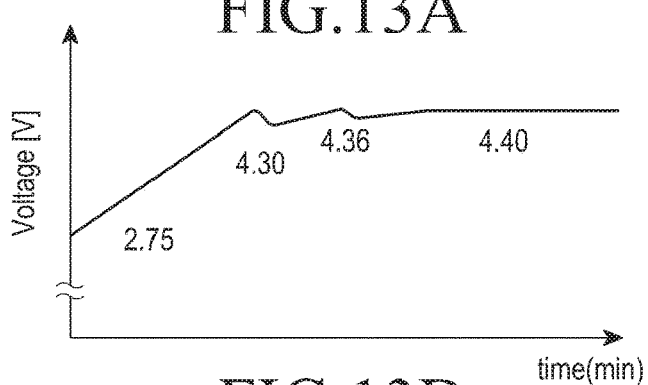

Referring to FIG. 13B, the voltage at the input end 342 of the battery 350 may be increased at different rates in the first to fourth periods, during the fast charging. Meanwhile, the voltage may be decreased at a transition time between the first and second periods, at a transition time between the second and third periods, and at a transition time between the third and fourth periods. A voltage decrement may be larger than a previous increment.

Figure 13C:
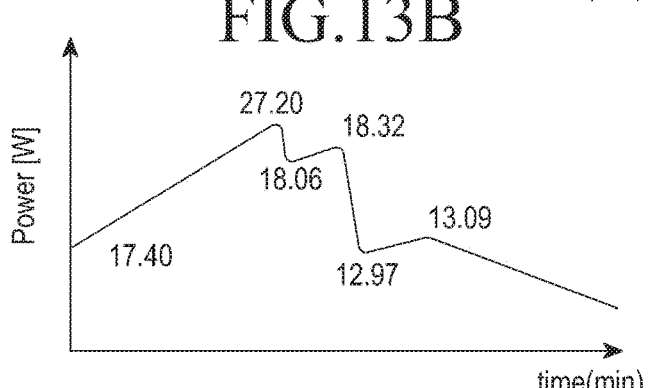

Referring to FIG. 13C, the power at the input end 342 of the battery 350 may be increased in the first period and then decreased in the second, third, and fourth periods, during the fast charging.

Figure 13D:
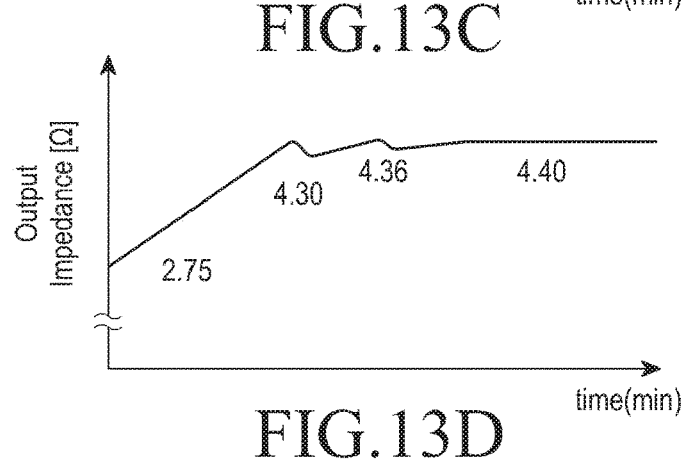

Referring to FIG. 13D, the impedance at the input end 342 of the battery 350 may be increased at different rates in the first to fourth periods during the fast charging. Meanwhile, the impedance may be decreased at the transition time between the first and second periods, at the transition time between the second and third periods, and at the transition time between the third and fourth periods. An impedance decrement may be larger than a previous increment.

In operation 1230, the wireless power receiver may determine whether an abrupt change has occurred to at least one of the current and voltage at the input end 342 of the battery 350. For example, at least one of the current and voltage at the input end 342 of the battery 350 may be abruptly changed at a transition time between two periods, as illustrated in FIG. 13A or 13B. The wireless power receiver may monitor at least one of the current and voltage at the input end 342 of the battery 350 with the passage of time. If a variation of the at least one of the current and voltage exceeds a predetermined threshold, the wireless power receiver may determine that an abrupt change has occurred to the at least one of the current and voltage. Or the wireless power receiver may detect an abrupt change in the impedance at the input end 342 of the battery 350, as an event indicating a change in the impedance at the output end 341 of the DC/DC converter 330.

If the wireless power receiver determines that an abrupt change has occurred to at least one of the current and voltage at the input end 342 of the batter 350, the wireless power receiver may adjust voltage at the output end 341 of the DC/DC converter 330 in operation 1240. In various embodiments of the present disclosure, the wireless power receiver may pre-store information about a relationship between an abrupt change in at least one of current and voltage at the input end 342 of the battery 350 and at least one of current and voltage at the output end 341 of the DC/DC converter 330. The wireless power receiver may adjust the voltage at the output end 341 of the DC/DC converter 330, referring to the pre-stored relationship information. In another embodiment, the wireless power receiver may calculate voltage at the output end 341 of the DC/DC converter 330 which results in a predetermined value of impedance at the output end 341 of the DC/DC converter 330. The wireless power receiver may adjust the voltage at the output end 341 of the DC/DC converter 330 based on the calculation result. In another embodiment, after adjusting the voltage at the output end 341 of the DC/DC converter 330, the wireless power receiver may calculate wireless charging efficiency. In this case, the wireless power receiver may repeatedly adjust the voltage at the output end 341 of the DC/DC converter 330 so as to increase the wireless charging efficiency. The wireless power receiver may directly calculate a wireless charging efficiency or receive a calculated wireless charging efficiency from a wireless power transmitter. In the case where the wireless power receiver directly calculates a wireless charging efficiency, the wireless power receiver may receive information about power transmitted by the wireless power transmitter by inband or outband communication. Then, the wireless power receiver may calculate the wireless charging efficiency based on the received information.

As described above, the impedance at the output end 341 of the DC/DC converter 330 may have a predetermined value in the wireless power receiver, thereby maintaining relatively high wireless charging efficiency.

Figure 14:
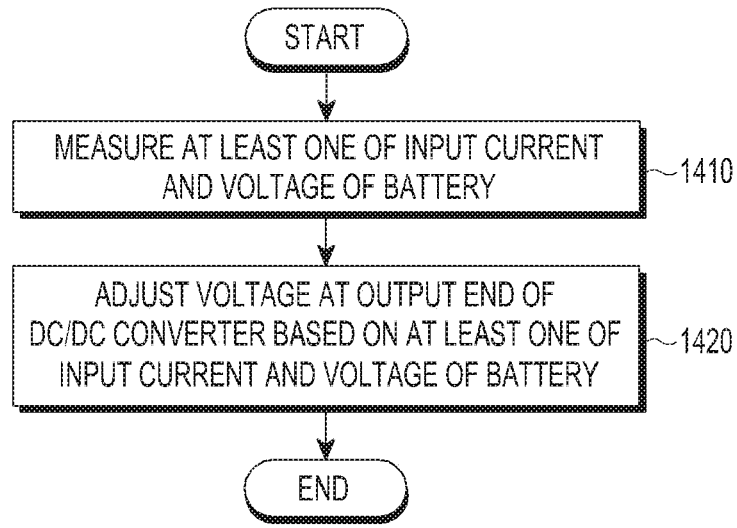
FIG. 14 is a flowchart illustrating a method for controlling a wireless power receiver according to various embodiments of the present disclosure.

FIG. 14 is a flowchart illustrating a method for controlling a wireless power receiver according to various embodiments of the present disclosure.

Referring to FIG. 14, the wireless power receiver may measure at least one of input current and voltage of the battery in operation 1410, and adjust output voltage of the DC/DC converter based on the at least one of the input current and voltage of the battery in operation 1420. As described before, upon detection of a decrease in the input current of the battery, the wireless power receiver may decrease the output voltage of the DC/DC converter. Or upon detecting that the input voltage of the battery is kept at a predetermined value, the wireless power receiver may decrease the output voltage of the DC/DC converter. Or when at least one of the input current and voltage of the battery is abruptly changed, the wireless power receiver may adjust the output voltage of the DC/DC converter.

Figure 15:
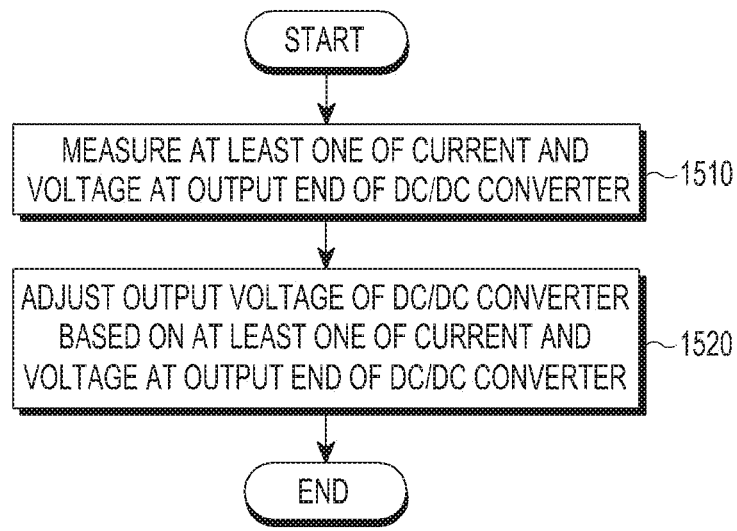
FIG. 15 is a flowchart illustrating a method for controlling a wireless power receiver according to various embodiments of the present disclosure.

FIG. 15 is a flowchart illustrating a method for controlling a wireless power receiver according to various embodiments of the present disclosure.

Referring to FIG. 15, the wireless power receiver may measure at least one of input current and voltage at the output end of the DC/DC converter in operation 1510, and adjust output voltage of the DC/DC converter based on the at least one of the input current and voltage at the output end of the DC/DC converter in operation 1520. As described before, upon detection of a decrease in the input current at the output end of the DC/DC converter, the wireless power receiver may decrease the output voltage of the DC/DC converter. Or the wireless power receiver may calculate impedance at the output end of the DC/DC converter. If the difference between the calculated impedance and a reference impedance is equal to or larger than a threshold, the wireless power receiver may decrease the output voltage of the DC/DC converter. Or when at least one of current and impedance at the output end of the DC/DC converter is abruptly changed, the wireless power receiver may adjust the output voltage of the DC/DC converter.

Figure 16:
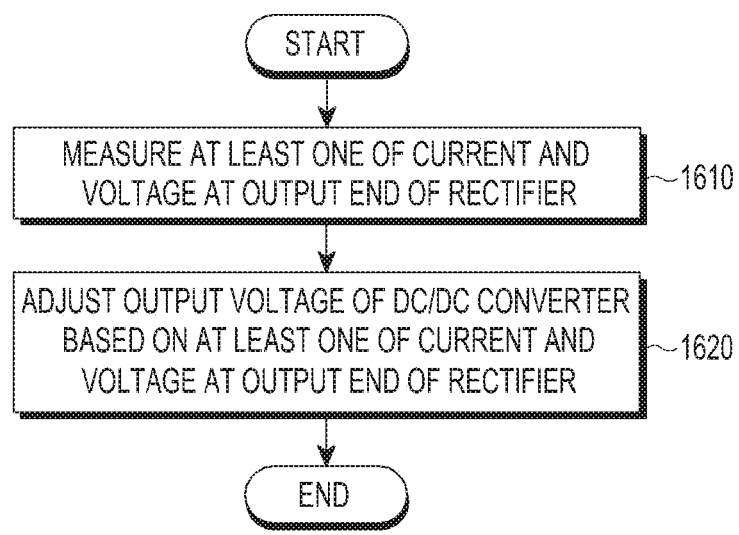
FIG. 16 is a flowchart illustrating a method for controlling a wireless power receiver according to various embodiments of the present disclosure.

FIG. 16 is a flowchart illustrating a method for controlling a wireless power receiver according to various embodiments of the present disclosure.

Referring to FIG. 16, the wireless power receiver may measure at least one of input current and voltage at the output end of the rectifier in operation 1610, and adjust output voltage of the DC/DC converter based on the at least one of the input current and voltage at the output end of the rectifier in operation 1620. As described before, upon detection of a decrease in the input current at the output end of the rectifier, the wireless power receiver may decrease the output voltage of the DC/DC converter. Or the wireless power receiver may calculate impedance at the output end of the rectifier. If the difference between the calculated impedance and a reference impedance is equal to or larger than a threshold, the wireless power receiver may decrease the output voltage of the DC/DC converter. Or when at least one of the input current and voltage at the output end of the rectifier is abruptly changed, the wireless power receiver may adjust the output voltage of the DC/DC converter.

As described above with reference to FIGS. 14 to 16, the wireless power receiver may control maintenance of a predetermined impedance value by adjusting voltage at the output end of the DC/DC converter using electrical characteristics of various points in the circuit.

In various embodiments of the present disclosure, a method for controlling a wireless power receiver may include receiving electromagnetic waves from a wireless power transmitter and outputting AC power, rectifying the AC power into DC power, converting the rectified DC power, charging a battery of the wireless power receiver with the converted DC power, and upon detection of an event indicating a change in impedance at an output end of a DC/DC converter, controlling the impedance at the output end of the DC/DC converter to be kept constant by adjusting voltage at the output end of the DC/DC converter.

In various embodiments of the present disclosure, the controlling of the impedance at the output end of the DC/DC converter to be kept constant may include, upon detection of a decrease in current at an input end of the battery as the event, controlling the voltage at the output end of the DC/DC converter to be decreased.

In various embodiments of the present disclosure, the controlling of the impedance at the output end of the DC/DC converter to be kept constant may include, upon detection of switching of a charging mode of the battery from a CC mode to a CV mode as the event, controlling the voltage at the output end of the DC/DC converter to be decreased.

In various embodiments of the present disclosure, the controlling of the impedance at the output end of the DC/DC converter to be kept constant may include, upon detection of an abrupt change in current at an input end of the battery, adjusting the voltage at the output end of the DC/DC converter.

In various embodiments of the present disclosure, the controlling of the impedance at the output end of the DC/DC converter to be kept constant may include, if current at an input end of the battery increases abruptly, increasing the voltage at the output end of the DC/DC converter, and if the current at the input end of the battery decreases abruptly, decreasing the voltage at the output end of the DC/DC converter.

In various embodiments of the present disclosure, the controlling of the impedance at the output end of the DC/DC converter to be kept constant may include measuring current and voltage at an input end of the battery, measuring impedance at the input end of the battery using the measured current and voltage, and upon detection of an abrupt change in the impedance at the input end of the battery as the event, adjusting the voltage at the output end of the DC/DC converter.

In various embodiments of the present disclosure, the controlling of the impedance at the output end of the DC/DC converter to be kept constant may include, upon detection of voltage having a predetermined value at an input end of the battery as the event, controlling the voltage at the output end of the DC/DC converter to be decreased.

In various embodiments of the present disclosure, the controlling of the impedance at the output end of the DC/DC converter to be kept constant may include, upon detection of a decrease in current at the output end of the DC/DC converter as the event, controlling the voltage at the output end of the DC/DC converter to be decreased.

In various embodiments of the present disclosure, the controlling of the impedance at the output end of the DC/DC converter to be kept constant may include measuring current and voltage at the output end of the DC/DC converter, measuring the impedance at the output end of the DC/DC converter using the measured current and voltage, and if detecting as the event that a difference between a reference value and the impedance at the output end of the DC/DC converter exceeds a first threshold, adjusting the voltage at the output end of the DC/DC converter.

In various embodiments of the present disclosure, the controlling of the impedance at the output end of the DC/DC converter to be kept constant may include measuring current and voltage at the output end of the DC/DC converter, measuring the impedance at the output end of the DC/DC converter using the measured current and voltage, and upon detection of an abrupt change in the impedance at the output end of the DC/DC converter as the event, adjusting the voltage at the output end of the DC/DC converter.

In various embodiments of the present disclosure, the controlling of the impedance at the output end of the DC/DC converter to be kept constant may include, after adjusting the voltage at the output end of the DC/DC converter, acquiring a wireless charging efficiency and re-adjusting output voltage of the DC/DC converter based on the acquired wireless charging efficiency.

In various embodiments of the present disclosure, the controlling of the impedance at the output end of the DC/DC converter to be kept constant may include, after adjusting the voltage at the output end of the DC/DC converter, monitoring whether the event has been released and re-adjusting the voltage at the output end of the DC/DC converter based on the monitoring.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

The term "module" as used herein may include its ordinary meaning including, for example, a unit of one, or a combination of two or more. The term "module" may be used interchangeably with terms such as, for example, unit, logic, logical block, component, or circuit. A "module" may be the smallest unit of an integrated part, or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a non-transitory computer-readable storage medium, in the form of a programming module. When the commands are executed by a processor (for example, the processor 120), one or more processors may execute functions corresponding to the commands. The non-transitory computer-readable storage medium may be, for example, the memory 130.

The non-transitory computer-readable recording medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, ROM, random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

According to various embodiments of the present disclosure, in a storage medium storing commands, the commands are configured to make at least one processor perform at least one operation, when the commands are executed by the at least one processor. The at least one operation may include receiving electromagnetic waves from a wireless power transmitter and outputting AC power, rectifying the AC power into DC power, converting the rectified DC power, charging a battery of the wireless power receiver with the converted DC power, and upon detection of an event indicating a change in impedance at an output end of a DC/DC converter, controlling the impedance at the output end of the DC/DC converter to be kept constant by adjusting voltage at the output end of the DC/DC converter.

As is apparent from the foregoing description of various embodiments of the present disclosure, a wireless power receiver for maintaining impedance at a predetermined value adaptively without a matching circuit for impedance matching, and a method for controlling the wireless power receiver can be provided. Because the wireless power receiver does not include a matching circuit, the weight and volume of the wireless power receiver may be reduced. Furthermore, an installation area can be secured due to the absence of a matching circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless power receiver comprising:
   a resonant circuit configured to receive electromagnetic waves from a wireless power transmitter and output alternate current (AC) power;
   a rectifier configured to rectify the AC power received from the resonant circuit into direct current (DC) power;
   a DC/DC converter configured to convert the DC power received from the rectifier and output the converted DC power;
   a battery;
   a charger configured to charge the battery with the converted DC power; and
   a controller configured to, upon detection of an event indicating a change in impedance at an output end of the DC/DC converter, control the impedance at the output end of the DC/DC converter and keep the impedance constant by adjusting voltage at the output end of the DC/DC converter.

2. The wireless power receiver of claim 1, wherein, upon detection of a decrease in current at an input end of the battery as the event, the controller is further configured to control the voltage at the output end of the DC/DC converter to be decreased.

3. The wireless power receiver of claim 1, wherein, upon detection of switching of a charging mode of the battery from a constant current mode to a constant voltage mode as the event, the controller is further configured to control the voltage at the output end of the DC/DC converter to be decreased.

4. The wireless power receiver of claim 1, wherein, upon detection of an abrupt change in current at an input end of the battery, the controller is further configured to adjust the voltage at the output end of the DC/DC converter.

5. The wireless power receiver of claim 4, wherein, if current at the input end of the battery increases abruptly, the controller is further configured to increase the voltage at the output end of the DC/DC converter, and
   wherein, if the current at the input end of the battery decreases abruptly, the controller is further configured to decrease the voltage at the output end of the DC/DC converter.

6. The wireless power receiver of claim 1, wherein the controller is further configured to:
   measure current and voltage at an input end of the battery;
   measure impedance at the input end of the battery using the measured current and voltage; and
   upon detection of an abrupt change in the impedance at the input end of the battery as the event, adjust the voltage at the output end of the DC/DC converter.

7. The wireless power receiver of claim 1, wherein, upon detection of a voltage having a predetermined value at an input end of the battery as the event, the controller is further configured to control the voltage at the output end of the DC/DC converter to be decreased.

8. The wireless power receiver of claim 1, wherein, upon detection of a decrease in current at the output end of the DC/DC converter as the event, the controller is further configured to control the voltage at the output end of the DC/DC converter to be decreased.

9. The wireless power receiver of claim 1, wherein the controller is further configured to:
   measure current and voltage at the output end of the DC/DC converter;
   measure the impedance at the output end of the DC/DC converter using the measured current and voltage; and
   if detecting as the event that a difference between a reference value and the impedance at the output end of the DC/DC converter exceeds a first threshold, adjust the voltage at the output end of the DC/DC converter.

10. The wireless power receiver of claim 1, wherein the controller is further configured to:
    measure current and voltage at the output end of the DC/DC converter;
    measure the impedance at the output end of the DC/DC converter using the measured current and voltage; and
    upon detection of an abrupt change in the impedance at the output end of the DC/DC converter as the event, adjust the voltage at the output end of the DC/DC converter.

11. The wireless power receiver of claim 1, wherein, after adjusting the voltage at the output end of the DC/DC converter, the controller is further configured to:
    acquire a wireless charging efficiency; and
    re-adjust output voltage of the DC/DC converter based on the acquired wireless charging efficiency.

12. The wireless power receiver of claim 1, wherein, after adjusting the voltage at the output end of the DC/DC converter, the controller is further configured to:
    monitor whether the event has been released; and
    re-adjust the voltage at the output end of the DC/DC converter based on a result released in monitoring the event.

13. A method for controlling a wireless power receiver, the method comprising:
    receiving electromagnetic waves from a wireless power transmitter and outputting alternate current (AC) power;
    rectifying the AC power into direct current (DC) power;
    converting the DC power;
    charging a battery of the wireless power receiver with the converted DC power; and
    upon detection of an event indicating a change in impedance at an output end of a DC/DC converter, controlling the impedance at the output end of the DC/DC converter and keeping the impedance constant by adjusting voltage at the output end of the DC/DC converter.

14. The method of claim 13, wherein the controlling the impedance at the output end of the DC/DC converter to be kept constant comprises, upon detection of a decrease in current at an input end of the battery as the event, controlling the voltage at the output end of the DC/DC converter to be decreased.

15. The method of claim 13, wherein the controlling the impedance at the output end of the DC/DC converter to be kept constant comprises, upon detection of switching of a charging mode of the battery from a constant current mode to a constant voltage mode as the event, controlling the voltage at the output end of the DC/DC converter to be decreased.

16. The method of claim 13, wherein the controlling the impedance at the output end of the DC/DC converter to be kept constant comprises, upon detection of an abrupt change in current at an input end of the battery, adjusting the voltage at the output end of the DC/DC converter.

17. The method of claim 16, wherein the controlling the impedance at the output end of the DC/DC converter to be kept constant comprises:
    if current at the input end of the battery increases abruptly, increasing the voltage at the output end of the DC/DC converter; and if the current at the input end of the battery decreases abruptly, decreasing the voltage at the output end of the DC/DC converter.

18. The method of claim 13, wherein the controlling the impedance at the output end of the DC/DC converter to be kept constant comprises:

measuring current and voltage at an input end of the battery;

measuring impedance at the input end of the battery using the measured current and voltage; and upon detection of an abrupt change in the impedance at the input end of the battery as the event, adjusting the voltage at the output end of the DC/DC converter.

19. The method of claim 13, wherein the controlling the impedance at the output end of the DC/DC converter to be kept constant comprises, upon detection of a voltage having a predetermined value at an input end of the battery as the event, controlling the voltage at the output end of the DC/DC converter to be decreased.

20. The method of claim 13, wherein the controlling the impedance at the output end of the DC/DC converter to be kept constant comprises, upon detection of a decrease in current at the output end of the DC/DC converter as the event, controlling the voltage at the output end of the DC/DC converter to be decreased.

21. The method of claim 13, wherein the controlling the impedance at the output end of the DC/DC converter to be kept constant comprises:

measuring current and voltage at the output end of the DC/DC converter;

measuring the impedance at the output end of the DC/DC converter using the measured current and voltage; and if detecting as the event that a difference between a reference value and the impedance at the output end of the DC/DC converter exceeds a first threshold, adjusting the voltage at the output end of the DC/DC converter.

22. The method of claim 13, wherein the controlling the impedance at the output end of the DC/DC converter to be kept constant comprises:

measuring current and voltage at the output end of the DC/DC converter;

measuring the impedance at the output end of the DC/DC converter using the measured current and voltage; and upon detection of an abrupt change in the impedance at the output end of the DC/DC converter as the event, adjusting the voltage at the output end of the DC/DC converter.

23. The method of claim 13, wherein the controlling the impedance at the output end of the DC/DC converter to be kept constant comprises, after adjusting the voltage at the output end of the DC/DC converter, acquiring a wireless charging efficiency and re-adjusting the voltage at the output end of the DC/DC converter based on the acquired wireless charging efficiency.

24. The method of claim 13, wherein the controlling the impedance at the output end of the DC/DC converter to be kept constant comprises, after adjusting the voltage at the output end of the DC/DC converter, monitoring whether the event has been released and re-adjusting the voltage at the output end of the DC/DC converter based on the monitoring.

25. A non-transitory computer-readable recording medium storing commands configured to, when executed by at least one processor, cause the at least one processor to control to perform the method of claim 13.

* * * * *